United States Patent [19]

Dischert

[11] Patent Number: 4,594,616

[45] Date of Patent: Jun. 10, 1986

[54] RECORDING OF TIMING SIGNALS SYNCHRONOUS WITH A ROTARY RECORDER MEMBER

[75] Inventor: Robert A. Dischert, Burlington, N.J.

[73] Assignee: RCA Corporation, Princeton, N.J.

[21] Appl. No.: 571,155

[22] Filed: Jan. 18, 1984

Related U.S. Application Data

[63] Continuation of Ser. No. 216,170, Dec. 15, 1980, abandoned.

[51] Int. Cl.$^4$ .................. H04N 5/91; H04N 9/79; G11B 15/00
[52] U.S. Cl. .................... 360/36.1; 360/9.1; 358/337; 358/906
[58] Field of Search .............. 360/9.1–11.1, 360/36.1–37.1, 70, 73; 358/906, 312, 321–326, 337–339

[56] References Cited

U.S. PATENT DOCUMENTS

| | | |
|---|---|---|
| 3,197,559 | 7/1965 | Kihara . |
| 3,202,769 | 8/1965 | Coleman, Jr. ............ 360/36.1 |
| 3,470,317 | 9/1969 | Kihara . |
| 3,777,061 | 12/1973 | Takemura ............... 358/44 |
| 3,864,550 | 2/1975 | Cragon ................. 235/460 |
| 3,959,815 | 5/1976 | Rotter et al. ............ 360/70 |
| 3,962,725 | 6/1976 | Lemke et al. . |
| 3,978,521 | 8/1976 | Langer et al. . |
| 4,131,919 | 12/1978 | Lloyed ................. 360/9.1 |
| 4,133,009 | 1/1979 | Kittler ................. 360/11.1 |
| 4,277,729 | 7/1981 | Rodgers, III ........... 315/398 |
| 4,292,648 | 9/1981 | Kowal ................. 358/326 |

FOREIGN PATENT DOCUMENTS

| | | |
|---|---|---|
| 2701630 | 1/1977 | Fed. Rep. of Germany . |
| 7701785 | 1/1977 | France . |
| 1564441 | 4/1980 | United Kingdom . |

Primary Examiner—Raymond F. Cardillo
Assistant Examiner—Wayne Young
Attorney, Agent, or Firm—Eugene M. Whitacre; Paul J. Rasmussen; Joseph J. Laks

[57] ABSTRACT

A portable video recorder transduces video signals onto an elongated medium. The transducer-to-medium velocity is controlled by a rotary member such as a capstan, turntable or headwheel. In portable applications, motion of the recorder causes accelerations or variations in velocity of the rotary member which affects the regular spacing on the medium of sync or timing signals transduced thereto. Regular spacing of sync signals is desirable for good reproduction on playback. Timing or sync signals generated by the rotary members are used to control the rate of the timing signals of the video to be recorded as they are applied to the transducer, thereby making the spacing regular.

12 Claims, 11 Drawing Figures

RECORDING OF TIMING SIGNALS SYNCHRONOUS WITH A ROTARY RECORDER MEMBER

This is a continuation of application Ser. No. 216,170, filed Dec. 15, 1980, now abandoned.

This invention relates to a recorder for recording on an elongated medium such as tape and which includes a rotary member for controlling the relative speed between a transducer and the medium. In order to effect a regular placement of timing signals of the video to be recorded upon the tape, the timing signals are controlled by the velocity of the rotary member.

In electronic news-gathering (ENG) applications, a portable television camera is customarily taken to the scene of a news event. Sometimes the television signal generated by the camera is sent by a communications link such as a microwave link to a central point for utilization, but more commonly the signal is recorded by a portable video tape recorder (VTR) at the news scene. This avoids the need to set up and take down communications links and provides a permanent record regardless of atmospheric conditions that may affect that link. The portable VTR used for recording of the video is often in operation while being carried. In some cases, the VTR is carried by one member of a news team while the camera is carried by another member. It has been proposed to combine the recorder function and the television camera function into a single portable unit.

The video tape recorders used for ENG applications are almost universally of the helical-scan type in which a high tape-to-transducer relative velocity is achieved by the use of a rapidly rotating headwheel bearing the transducers. In studio machines powered from the alternating-current mains, powerful drive motors and high-gain servo loops can be used to maintain the headwheel velocity constant, but in portable equipment the power drain from the associated batteries is limited and therefore the forces which can be impressed upon the headwheel are limited. As described in U.S. patent application Ser. No. 201,053, filed Oct. 27, 1980, in the name of H. R. Warren, abandoned in favor of a continuation application Ser. No. 375,548, filed May 6, 1982 the motion imparted to the housing of a portable VTR while it is being carried causes accelerations of the headwheel relative to the baseplate or housing, and thereby causes variations in the velocity of the transducers relative to the tape, which can be corrected by a particular orientation of the headwheel relative to the motion. This particular orientation may not be compatible with the desired overall shape of the VTR. A method of operating a portable video camera in conjunction with a longitudinal VTR is described in U.S. Pat. No. 3,962,725 issued June 8, 1976 to Lemke, et al. In this arrangement, a control signal is prerecorded on the magnetic tape onto which the video signals are to be recorded. The prerecorded control signal is played back during the operation of recording the video and is used to control the deflection rate of the associated video camera. Thus, unavoidable changes in the speed with which the tape is driven during recording vary the rate of generation of the video signals. Such an arrangement, however, requires prerecording of the magnetic tape to be used, thereby decreasing the amount of tape available for audio and video recording. Furthermore, a dropout of the prerecorded track information impairs the ability of the arrangement to produce a usable recorded tape. In addition, it is not possible to reuse the tape following bulk erasure.

SUMMARY OF THE INVENTION

A television recorder for recording television signals including recurrent timing signals onto an elongated medium is adapted for use in environments in which the recorder may be subject to motion. It includes a transducer by which the signals are transduced to the recording medium and also includes a rotating member coupled to the medium for causing relative motion between the medium and the transducer. The rotatable member is subject to acceleration due to motion of the recorder, whereby the timing signals may not be transduced to regularly spaced positions on the medium. A tachometer or speed indicating arrangement is coupled to the rotatable member for generating signals indicative of the rate of rotation of the rotatable member. An arrangement is provided for changing the timing of the recurrent timing signal and it is coupled to the speed indicating arrangement for causing the rate of the timing signals to vary in response to the rate of rotation of the rotary member thereby causing the timing signals to be regularly placed on the medium.

DESCRIPTION OF THE DRAWING

FIG. 3a, b, c, and d illustrate timing waveforms and patterns imprinted on a portion of the apparatus of FIG. 2;

FIG. 4a, b, and c include a schematic diagram of a deflection amplifier which may be used in the arrangement of FIG. 2 together with associated voltage waveforms;

DESCRIPTION OF THE INVENTION

Figure 1:
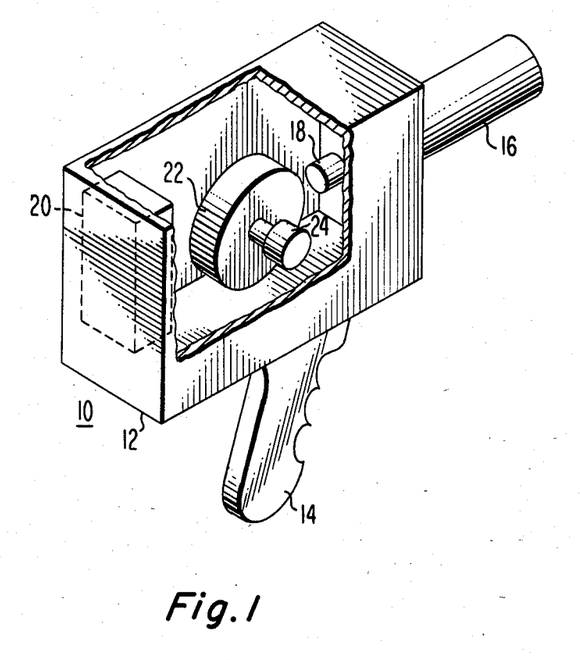
FIG. 1 illustrates a combination camera and recorder in accordance with a first embodiment of the invention.

In FIG. 1, a physically-combined camera and tape recorder designated generally as 10 includes a body 12 connected to a handle 14. An optical lens arrangement 16 is coupled to an optical-to-electrical transducer illustrated as 18. Transducer 18 may include one or more camera tubes such as vidicons or it may include a solid-state image sensor such as a CCD array. Included within housing 12 is a cartridge 20 for holding the magnetic tape (not shown). During operation, the magnetic tape is wound about a headwheel 22 driven by a motor 24.

As described by Warren, headwheel 22 may be subject to changes in velocity resulting from vertical panning of the arrangement 10. Such changes in rotational velocity change the scanning rate at which magnetic heads (not shown in FIG. 1) associated with headwheel 22 scan, thereby affecting the distance scanned by the recording transducers across the magnetic tape per unit time. Consequently, regularly recurring vertical and horizontal sync signals included with the video are not transduced to regularly spaced positions on the tape. This in turn may lead to difficulties in reproduction upon playback.

Figure 2:
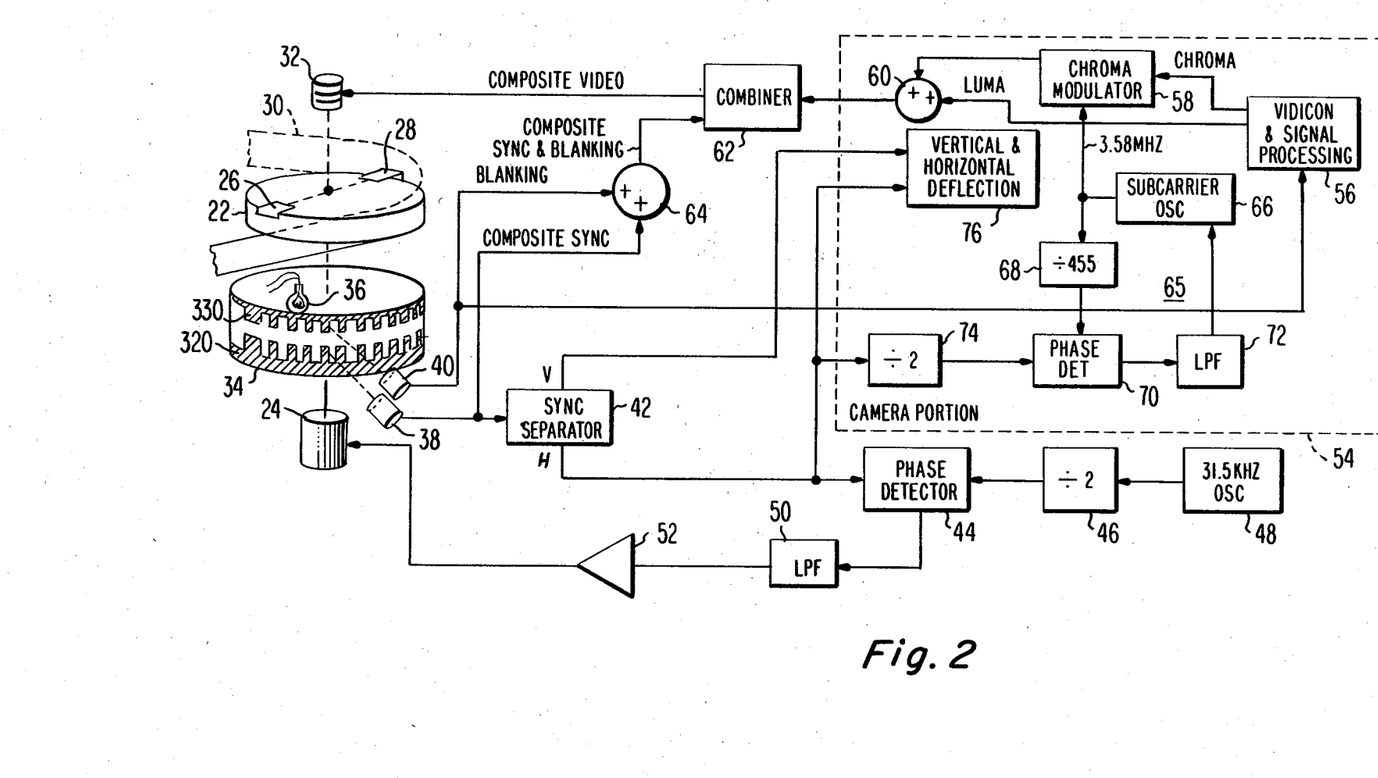
FIG. 2 is a diagram partially in block and partially in pictorial form representing the workings of a portion of the arrangement of FIG. 1.

In FIG. 2, headwheel 22 at the left includes recording transducers 26 and 28 adapted for scanning across a magnetic tape 30 illustrated partially by phantom lines. Tape 30 moves relatively slowly compared with the rotational velocity of headwheel 22 so as to scan parallel tracks in a helical fashion upon the tape. Headwheel 22 is illustrated as being mechanically coupled to drive motor 24. Also coupled to headwheel 22 and motor 24 is a slip ring assembly 32 and a mechanical synchronizing signal generating wheel 34. Wheel 34 may for example be a transparent film upon which opaque printed patterns 320 and 330 define synchronizing signals and blanking signals, respectively. A lamp 36 within wheel 34 illuminates the interior and allows light to exit between the opaque portions. Photosensors 38 and 40 are fixedly mounted outside wheel 34 with their photosensitive surfaces directed towards lamp 36 from positions selected so that the synchronizing and blanking signals transduced thereby occur at times at which particular positions are taken by recording transducers 26 and 28 relative to tape 30. Vertical (V) and horizontal (H) synchronizing signals are transduced from wheel 34 by photosensor 38, and blanking signals at related times are transduced by photosensor 40.

In order to maintain a substantially constant velocity of headwheel 22, a phase-lock loop slaves the mechanically generated horizontal sync signals to a fixed-frequency signal. The phase-lock loop includes a sync signal separator 42 for separating the horizontal synchronizing signals from the composite synchronizing signals transduced by photosensor 38, and a phase detector 44 coupled to receive the separated horizontal sync signals. Also coupled to phase detector 44 are horizontal-rate signals from a divide-by-two frequency divider 46 driven by a 31.5 KHz oscillator 48. The output of the phase detector is applied to a low-pass filter (LPF) 50, the output of which drives a drive amplifier 52 which in turn controls the motor speed. Whenever the average velocity of the headwheel is such that the mechanically generated horizontal signals differ in rate from the reference horizontal signals, the loop slews to make them equal. However, because of the bandwidth limitations of LPF 50 and the power limitations of amplifier 52, the loop cannot correct instantaneously. Consequently, short periods of substantial velocity change can be expected due to mechanical motion of the recorder. According to an aspect of the invention, the synchronizing or timing signals derived from wheel 34 are used to control the scanning rate of the camera portion 54 of the arrangement. Camera portion 54 includes a block 56 representing the vidicon 18 together with some ancillary signal processing. The ancillary processing includes gamma correction and video blanking circuits, and in the event that the block 56 includes a single imaging device with a color filter for generating the video, it may also include luminance and chrominance demodulators. Blanking signals from photosensor 40 are coupled to block 56 to operate the video blanking circuits for eliminating video during the blanking interval. As is known, the chroma signals produced by block 56 are coupled to a chroma modulator to which is applied a 3.58 MHz subcarrier generated as described hereafter, and the modulated chrominance produced by modulator 58 is combined with luminance information in an adder 60 to produce composite luminance and chrominance information which is applied to a combiner 62. In combiner 62, composite sync and blanking information from an adder 64 is combined with the composite chrominance and luminance information to produce composite video which is applied to slip rings 32 for coupling to recording transducers 26 and 28.

In accordance with another aspect of the invention, the chroma subcarrier is locked to the mechanically generated timing signals. A subcarrier oscillator 66 is coupled in a phase-lock loop with a frequency divider 68 which divides by 455, a phase detector 70 and a low-pass filter 72. The divided subcarrier oscillator signal is compared in phase detector 70 with the H sync signal divided in a frequency divider 74 by the factor 2. Thus, the subcarrier oscillator is locked to 455 times half the line rate. The vertical and horizontal deflection circuits and windings associated with vidicon 18 are illustrated together as a block 76. As will be described hereafter, the vertical and/or the horizontal deflection rates are controllable for causing the scanning rate to speed up or slow down in consonance with the appropriate mechanically derived vertical or horizontal synchronizing signals.

Figure 3:
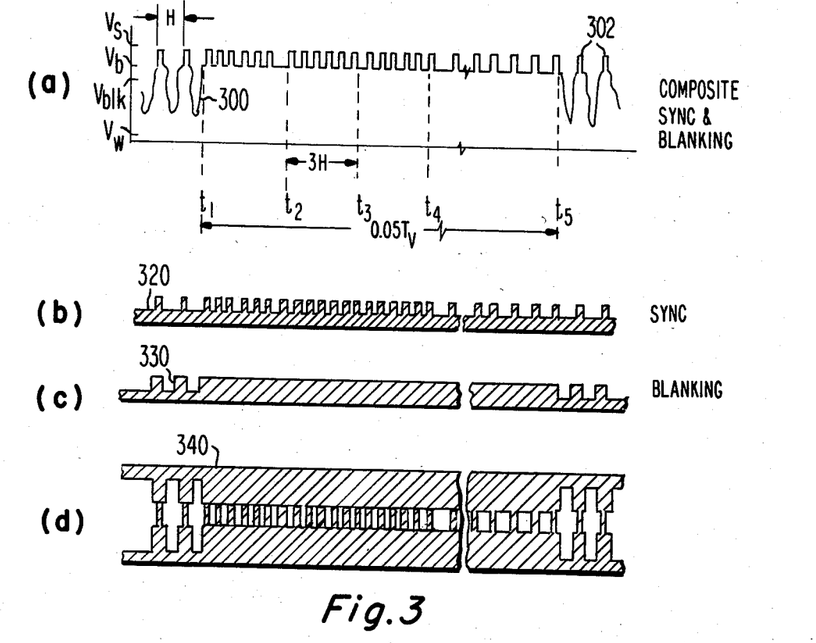

FIG. 3a illustrates an amplitude-time plot of a standard monochrome television signal 300 over an interval including the vertical blanking interval. As known, the vertical blanking interval extends from time T1 to T5 and the active video interval extends from time T5 to the next following time T1. Within each active video interval are sync signals illustrated as 302. During the vertical blanking interval, the horizontal-rate pulses also occur in the interval T4–T5, while double-rate pulses occur in the interval T1–T4. In the interval T2–T3, the double-rate pulses occur as serrations in a higher-level vertical synchronizing pulse. In order to mechanically generate signals representative of the synchronizing component required for a standard sync signal, the imprinting 320 of a portion of transparent wheel 34 is as illustrated in developed view in FIG. 3b. In FIG. 3b, the opaque portions are illustrated and can be seen to correspond with those portions of the signal of 3a lying between synchronizing voltage level VS and blanking voltage level VB. Photosensor 38 responds to the interruption of light passing through transparent wheel 34 occasioned by the opaque pattern of FIG. 3b to produce the sync signal. With two transducers 26 and 28 as illustrated in FIG. 2, one television field is transduced onto the tape for each half-rotation of the headwheel. Consequently, the sync pattern repeats twice around wheel 34. That is to say, wheel 34 includes a 2-field sync pattern including H sync pulses for two active video intervals. It should be noted that the V sync pattern for the second of the two fields differs slightly from that shown in FIG. 3a, and consequently, the corresponding pattern for FIG. 3b must be arranged to correspond.

As illustrated in FIG. 2, the transparent wheel 34 includes an upper imprinted portion 330, a portion of which in developed form is illustrated in FIG. 3c. It should be noted that pattern 330 is upside down in FIG. 3c compared with its position as illustrated in FIG. 2. The raised portions of opaque pattern 330 represents those portions of the rotation of headwheel 22 at which it is expected that the signal will be blanked. As such, pattern 330 can be seen to correspond to those portions of signal 300 between blanking level VB and black level VBLK.

Instead of using two photosensors 38 and 40 to produce separate composite sync and blanking signals, respectively, a single photosensor responsive to a multitude of values can be used together with a pattern such as developed pattern 340 of FIG. 3d. Comparison of pattern 340 with the composite sync and blanking portions of waveform 300 reveals that the opaque portion takes on different dimensions for the various components of the blanking signal. When a single transducer is used in this fashion, separation of the vertical and horizontal sync signals is required as illustrated in FIG. 2 but adder 64 may be eliminated.

Of course, annular magnetic strips appropriately magnetized with indicia representing the synchronizing and/or blanking signals may be used instead of wheel 34, in which case magnetic transducers would be used to transduce the mechanically produced synchronizing and blanking signals instead of photosensors 38 and 40.

Figure 4:
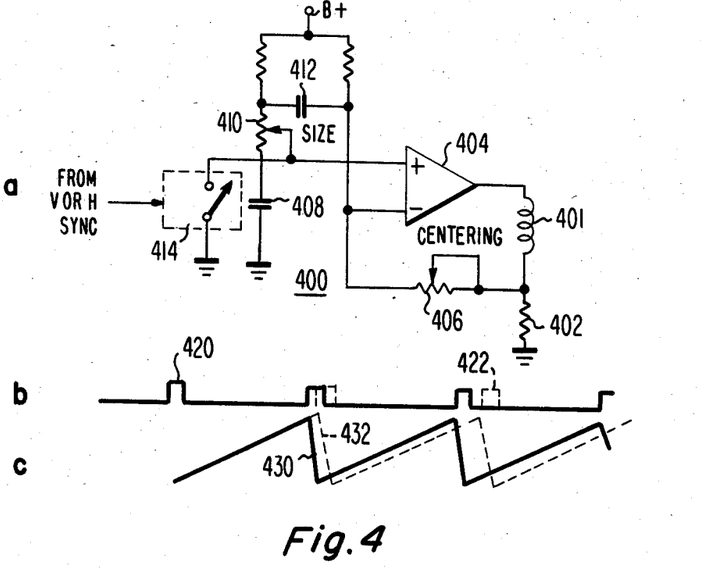

FIG. 4 illustrates a deflection circuit as described in U.S. Pat. No. 4,277,729 issued July 7, 1981 in the name of R. L. Rodgers, III. As illustrated in FIG. 4a, a deflection winding 400 in series with a current-sensing resistor 402 is driven by an amplifier 404. Voltage feedback representative of the current is provided by way of a centering resistor 406 to the inverting input of amplifier 404. The signal applied to the noninverting input of amplifier 404 is a sawtooth generated by charging a capacitor 408 through a SIZE control resistor 410. A capacitor 412 coupled to the upper end of resistor 410 and to the inverting input bootstraps the output signal to resistor 410 to maintain a constant voltage thereacross, thereby providing a constant charging current and a linear sawtooth. A controllable switch illustrated as 414 recurrently discharges capacitor 408 in response to a synchronizing signal. The deflection amplifier of FIG. 4a can be used for either vertical or horizontal deflection, and the appropriate sync signal is used to discharge the capacitor. Regularly recurring sync pulses 420 are illustrated by solid lines in FIG. 4b. The effect on the sync pulses when headwheel 22 is slowing down is illustrated by dotted-line pulses such as 422. The effect of the change in the periodic pulse rate upon the sawtooth deflection current can be understood by comparing solid-line portions 430 representing the deflection current with regularly recurring sync pulses 420 with dotted-line portions 432 representing the deflection current in response to sync pulses 422 resulting from a slowing of headwheel 22. It can be seen that the peak amplitude reached by the sawtooth waveform is greater in the case of the slowed waveform. In the case of increasing speed of headwheel 22, the sync pulses would be more closely spaced in time and the peak amplitude of the sawtooth deflection waveform would shrink. The result of the changes in peak amplitude of the deflection waveform is change in the effective size of the image scanned by the transducer. Thus, in addition to the regular placement of sync signals on the recording medium, changes in angular velocity of the headwheel also change the apparent size of the recorded image.

Figure 5:
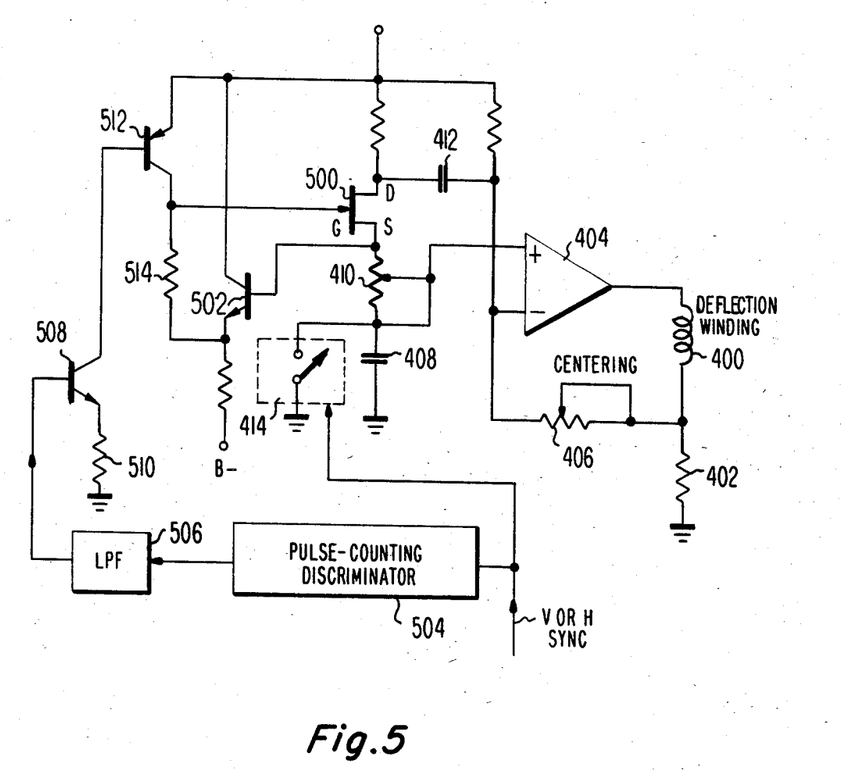
FIG. 5 illustrates an improved deflection amplifier according to another embodiment of the invention.

FIG. 5 illustrates an arrangement for correcting for image size changes. In FIG. 5, elements corresponding to those of FIG. 4 are provided with the same reference numbers. In FIG. 5, a field-effect transistor (FET) 500 is coupled in series with size control resistor 410. FET 500 is operated as a resistor the magnitude of which is dependent upon source-gate voltage. An emitter-follower connected transistor 502 has its base connected to the source of transistor 500. The emitter of transistor 502 is at approximately the same voltage as the source of FET 500. The voltage from gate to source of transistor 500 is controlled by a pulse-counting discriminator 504 coupled to receive the appropriate vertical or horizontal synchronizing signals for producing in conjunction with a low-pass filter 506 a signal representative of the time integral of the pulses. This time integral signal is representative of the pulse rate and is applied across the base-emitter junction of resistor 508 and resistor 510 to produce a current representative of the pulse rate. The current is transduced by a PNP transistor 512 to a resistor 514 for controlling the gate-source voltage in response to the synchronizing pulse rate. As the pulse rate changes, the resistance of FET 500 changes incrementally so as to change the rate of charge of sawtooth capacitor 408 thereby maintaining a constant peak-to-peak amplitude of the deflection.

Figure 6:
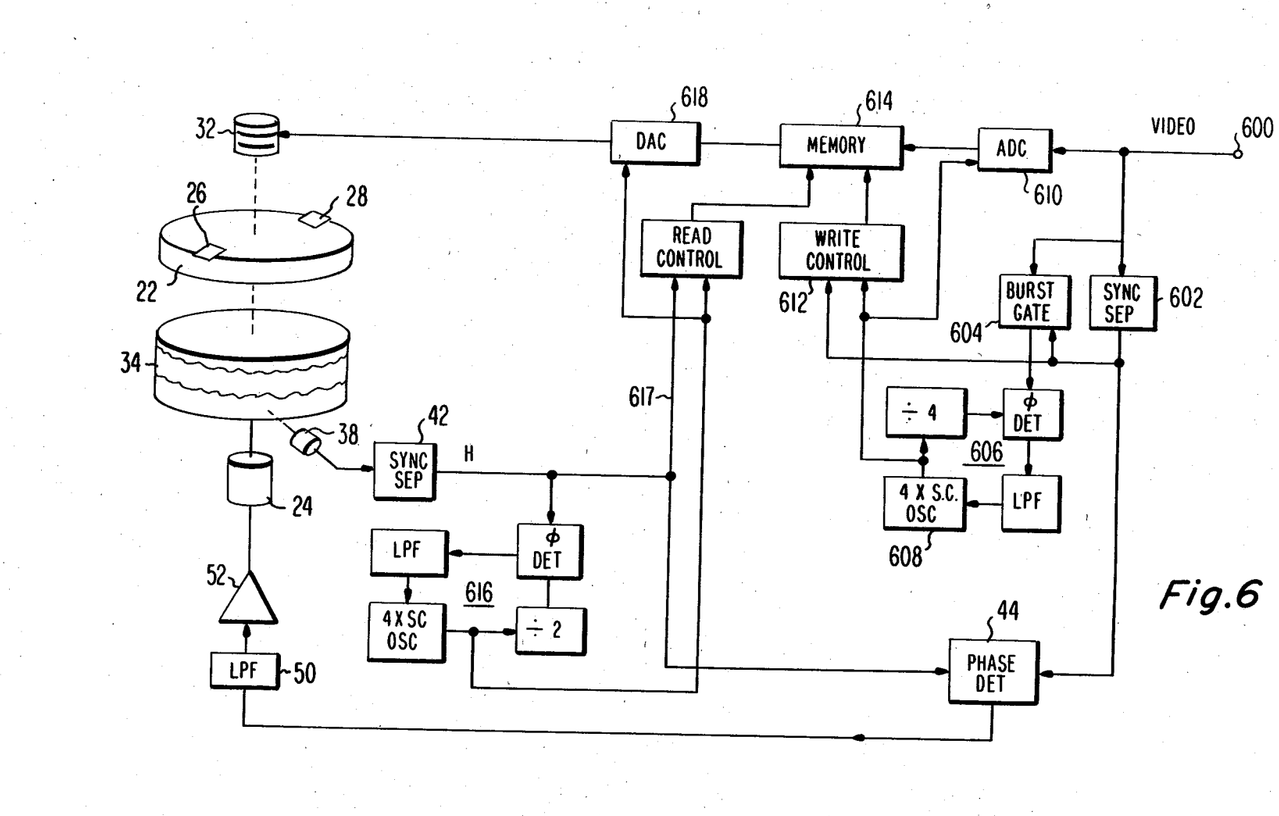
FIG. 6 is a diagram partially in block and partially in pictorial form of another embodiment of the invention.

FIG. 6 illustrates another embodiment of the invention. Those portions of FIG. 6 corresponding to elements of FIG. 2 are provided with the same reference numbers. Video signals are provided to a terminal 600 at the right of FIG. 6 from a source (not shown). A sync separator 602 coupled to terminal 600 separates horizontal synchronizing signals from the incoming video. In order to maintain headwheel 22 at the left of FIG. 6 in synchronism with the average rate of the incoming video, a phase-lock loop including photosensor 38, sync separator 42, phase detector 44, low-pass filter 50 and drive amplifier 52 is used to control motor 24 to maintain the speed of headwheel 22 and mechanical sync producing wheel 34 at the same average rate as the separated sync from separator 602.

The incoming video includes color subcarrier and burst. A burst gate 604 is gated by separated horizontal sync from separator 602 and the burst so gated is applied to a phase-lock loop designated generally as 606 for locking an oscillator 608 to four times the subcarrier frequency (4XSC). The signal from oscillator 608 is applied as a clock to an ADC 610 and to the write control 612 for a digital memory 614. Write control 612 writes into memory 614 the digitized video from ADC 610 at the rate at which it is supplied. However, since headwheel 22 may have short-term fluctuations in velocity about the average rate, reading from memory at a constant rate would result in transducing of the various timing signals including the chroma subcarrier or timing signal onto the tape at spacings which are not regular, thereby making playback difficult. In the arrangement of FIG. 6, this is corrected by coupling to the read control mechanically generated horizontal sync signals and 4XSC clock signals derived therefrom by a PLL designated generally as 616. Thus, reading from the memory is accomplished at the average rate of the incoming video, for otherwise memory 614 would overflow or become empty. However, the short-term variations in velocity of headwheel 22 are compensated for by reading from memory 614 at correspondingly increased or decreased rates. The signal read from memory 614 is coupled to a DAC 618 driven by the clock signal from PLL 616, and the resulting analog signal is applied to slip rings 32 for application to transducers 22 and 28 as in the case of FIG. 2.

Other embodiments of the invention will be obvious to those skilled in the art. For example, standard television sync signals may be generated electronically from nonstandard sync signals transduced from wheel 34. The effect on speed can result from other rotary members such as capstans or disc turntables, and consequently the mechanically derived sync or timing signal may be derived from capstans, idlers, turntables and the like. The timing signals to be regularly placed on the recording medium may as described be vertical or horizontal synchronizing signals, chroma burst or subcarrier signals or other video timing signals.

What is claimed is:

1. A television camera-recorder arrangement for recording television signals of an image from a camera tube onto an elongated recording medium for use in an environment where the recorder may be subject to motion, the arrangement comprising:

controllable ramp signal generating means;

deflection means coupled to said camera tube and to said ramp signal generating means for scanning said camera tube in response to said ramp signal, said ramp signal having an amplitude representing an extreme of said scanning;

means coupled to said camera tube for generating said television signals representative of the image, including recurrent timing portions generated at the rate of said ramp signal;

transducing means coupled to said camera tube for transducing said television signals to the elongated medium;

a source of reference signals having a predetermined frequency characteristic;

rotatable means responsive to said source of reference signals for providing stable long-term relative motion between said medium and said transducing means, said rotatable means being subject to acceleration due to recorder motion, thereby causing short-term variations in the rotational velocity of said rotatable means, whereby said timing portions may not be transduced to regualr positions on said medium;

speed indicating means coupled to said rotatable means for generating signals indicative of the rate of rotation of said rotatable means;

first control means coupled to said ramp signal generating means and to said speed indicating means for causing the rate of recurrence of said scanning to vary in response to said rate of rotation, thereby causing said recurrent timing portions to be regularly placed on said recording medium, whereby the interval between said recurrent timing portions changes in response to said short-term variations, tending to produce concurrent amplitude changes in said ramp signal which may cause apparent variations in the size of the image displayed from the record; and amplitude control means coupled to said ramp signal generating means for controlling the slope of said ramp signal in response to said signals indicative of the rate of rotation of said rotatable means for maintaining said amplitude of said ramp signal substantially unchanged, thereby reducing said apparent variations in the size of the image.

2. A recorder as in claim 1 wherein said rotatable means is a headwheel.

3. A recorder according to claim 1 wherein said elongated recording medium is magnetic tape.

4. A recorder according to claim 1 wherein said rotatable means includes a phase detector responsive to said reference signals and to said signals indicative of the rate of rotation of said rotatable means for providing said stable long-term relative motion.

5. An arrangement according to claim 1 wherein said amplitude control means comprises controllable current means.

6. An arrangement according to claim 5 wherein said controllable current means comprises a field-effect transistor coupled with a linear resistance means.

7. A camera-recorder combination comprising:

a camera tube onto which a scene to be imaged is focussed for generating signals representative of the scene;

controllable sawtooth signal generating means;

deflection means coupled to said camera tube and to said sawtooth signal generating means for scanning said camera tube in response to said sawtooth signals for causing said signals representative of the scene to be generated at the rate of said sawtooth;

transducing means coupled to said camera tube for transducing onto a recording medium signals corresponding to said signals representative of the scene;

transducer scan control means coupled to said transducing means for controlling the scan velocity of said transducing means across said recording medium, motion of said recorder causing said scan velocity to vary, whereby if said sawtooth signals recur at a regular rate said signals representative of the scene and said corresponding signals also recur at a regular rate, and therefore the distance scanned on said recording medium between recurrences of said signals varies;

sawtooth rate control means coupled to said controllable sawtooth signal generating means and to said transducer scan control means for controlling the interval between recurrences of said signals whereby the signals recur at a regular rate corresponding to the transducer scan velocity, but a residual distortion of the recorded signal remains; and sawtooth ramp control means coupled to said controllable sawtooth signal generating means and to said transducer scan control means for varying the ramp rate of said sawtooth signal in consonance with said transducer scan velocity for reducing said residual distortion.

8. A camera-recorder combination adapted for recording scenes in the form of color television signals recorded on a recording medium, said combination comprising:

color television imaging means for generating signals representing at least one chrominance component of a scene;

color carrier generator means for generating a color carrier signal;

modulation means coupled to said imaging means and to said color carrier generator and adapted for modulating said color carrier signal with said chrominance component to form a modulated color carrier;

a recording medium;

transducing means coupled to said modulation means and to said recording medium for transducing said modulated color carrier with said recording medium;

transducer-to-recording medium scan control means coupled to said transducing means for causing said transducing means to scan said recording medium at a scan velocity; and color carrier frequency control means coupled to said color carrier generator means and to said scan control means for controlling the frequency of said color carrier signal in response to said scan velocity.

9. A combination as described in conjunction with claim 8 wherein:
said recording medium comprises magnetic tape;
said transducing means comprises a magnetic head; and said scan control means comprises a headwheel and headwheel drive means.

10. A combination as described in conjunction with claim 8 wherein said frequency control means comprises:
controllable oscillation means; and
phase-lock means coupled to said scan control means and said frequency control means for causing said frequency to respond to said scan velocity.

11. A camera-recorder combination according to claim 8 further comprising:
controllable imaging means coupled to said scan control means for controlling the scanning rate of said imaging means in consonance with said scan velocity.

12. Apparatus for recording a chrominance component signal of a color television signal, comprising:
a source of said chrominance component signal;
a controllable color carrier generator for generating a color carrier signal;
a recording medium;
a transducer;
scanning means coupled to said transducer for enabling said transducer to scan tracks on said recording medium at a scan velocity;
scan control means coupled to scanning means for controlling said scan velocity;
a color modulator coupled to said source of a chrominance component signal and to said color carrier generator for modulating said color carrier signal with said chrominance component signal to form a modulated color carrier signal, said modulated color carrier signal being coupled to said transducer to record said modulated color carrier signal in said tracks; and
frequency control means coupled to said color carrier generator and to said scanning means and responsive to said scan velocity for controlling the frequency of said color carrier signal in accordance with said scan velocity.

* * * * *